(12) United States Patent
Hammell et al.

(10) Patent No.: US 8,700,894 B2
(45) Date of Patent: Apr. 15, 2014

(54) METHOD AND SYSTEM FOR SECURING ROUTING INFORMATION OF A COMMUNICATION USING IDENTITY-BASED ENCRYPTION SCHEME

(75) Inventors: Bradley R. Hammell, Bridgeport, CT (US); Matthew J. Campagna, Ridgefield, CT (US); Bertrand Haas, New Haven, CT (US); Leon A. Pintsov, West Hartford, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 1720 days.

(21) Appl. No.: 11/873,673

(22) Filed: Oct. 17, 2007

(65) Prior Publication Data

US 2009/0103734 A1   Apr. 23, 2009

(51) Int. Cl.
*H04L 29/06* (2006.01)
*H04L 9/00* (2006.01)
*H04L 9/08* (2006.01)

(52) U.S. Cl.
USPC ............ 713/162; 713/163; 380/277; 380/278

(58) Field of Classification Search
USPC ........ 713/162–163; 380/277–278, 23, 25, 47, 380/48
See application file for complete search history.

(56) References Cited

U.S. PATENT DOCUMENTS

| | | | |
|---|---|---|---|
| 5,479,514 A * | 12/1995 | Klonowski | 380/47 |
| 5,872,850 A * | 2/1999 | Klein et al. | 705/51 |
| 6,986,036 B2 | 1/2006 | Wang et al. | |
| 7,003,117 B2 | 2/2006 | Kacker et al. | |
| 7,103,911 B2 * | 9/2006 | Spies et al. | 726/3 |
| 7,113,594 B2 | 9/2006 | Boneh et al. | |
| 7,114,073 B2 * | 9/2006 | Watanabe | 713/176 |
| 2005/0172120 A1 * | 8/2005 | Wang et al. | 713/160 |
| 2006/0023887 A1 * | 2/2006 | Agrawal et al. | 380/277 |
| 2008/0016338 A1 * | 1/2008 | Sun | 713/163 |
| 2008/0022389 A1 * | 1/2008 | Calcev et al. | 726/14 |
| 2008/0148047 A1 * | 6/2008 | Appenzeller et al. | 713/162 |
| 2008/0317002 A1 * | 12/2008 | Boppana et al. | 370/352 |

OTHER PUBLICATIONS

Zhuang et al. "Cashmere: Resilient Anonymous Routing" found at http://research.microsoft.com/~antr/MS/cashmere.pdf (Internet Archived Wayback Machine, May 4, 2005).*

(Continued)

*Primary Examiner* — Luu Pham
*Assistant Examiner* — Kari Schmidt
(74) *Attorney, Agent, or Firm* — Brian A. Lemm; Charles R. Malandra, Jr.; Steven J. Shapiro (57) ABSTRACT

Methods and systems for providing confidentiality of communications sent via a network that is efficient, easy to implement, and does not require significant key management. The identity of each node of the routing path of a communication is encrypted utilizing an identity-based encryption scheme. This allows each node of the routing path to decrypt only those portions of the routing path necessary to send the communication to the next node. Thus, each node will only know the immediate previous node from which the communication came, and the next node to which the communication is to be sent. The remainder of the routing path of the communication, along with the original sender and intended recipient, remain confidential from any intermediate nodes in the routing path. Use of the identity-based encryption scheme removes the need for significant key management to maintain the encryption/decryption keys.

7 Claims, 5 Drawing Sheets

(56) References Cited

OTHER PUBLICATIONS

Boukerche et al. "An efficient secure distributed anonymour routing protocol for mobile and wireless ad hoc networks." Computer Communications 28, 2005, pp. 1193-1203.*

Sifalakis et al. "Network Address Hopping: A Mechanism to Enhance Data Protection for Packet Communications." IEEE: 2005, pp. 1518-1523.*

El-Khatib et al. "Secure Dynamic Distributed Routing Algorithm for Ad Hoc Wireless Networks." Proceeding of the 2003 Internation Conference on Parallel Processing Workshops, IEEE, 2003.*

Boneh, D. and Franklin, M.; "Identity-Based Encryption from the Weil Pairing," SIAM Journal of Computing, vol. 32, No. 3, pp. 586-615, 2003.

Kate, Aniket et. al. "Pairing-Based Onion Routing" 7th Workshop on Privacy Enhancing Technologies, University of Ottawa, Canada, Jun. 2007.

* cited by examiner

METHOD AND SYSTEM FOR SECURING ROUTING INFORMATION OF A COMMUNICATION USING IDENTITY-BASED ENCRYPTION SCHEME

FIELD OF THE INVENTION

The invention disclosed herein relates generally to network communication systems, and more particularly to securing routing information of a message delivered via a network communication system using an identity-based signature scheme.

BACKGROUND OF THE INVENTION

In modern network communications systems (including both digital and physical), messages, e.g., data packets or paper envelopes, between parties are routed from the source to the destination via a series of addressable nodes included in the network. Both the source and destination address are typically viewable by all nodes in the network as the message traverses the path. In addition, both the contents of the message and identity of the parties under certain circumstances could be determined by eavesdropping on the network. In many situations, the parties desire to maintain confidentiality of both the contents of the messages exchanged and the fact that any messages at all are being exchanged. To provide such confidentiality, different types of protection schemes have been developed.

One such type of protection scheme is referred to as an "onion encryption scheme" as described in U.S. Pat. No. 6,986,036. As described therein, an onion encryption scheme involves multi-layered encryption and decryption operations. The client encrypts each message to be sent to the target server multiple times with different keys, one for each mix (a mix is a collection of nodes in the network) in the routing chain, in the order of the mixes in the chain. When the message is routed through the chain, each mix "peels off a layer of the onion" by decrypting the message with its key, and forwards the decrypted message to the next mix on the chain. More specifically, when the client intends to communicate with a target server, it sends a request for a secured routing chain to a trusted routing control server. The routing control server then selects servers for creating the routing chain, generates a first set of cryptographic keys for the respective servers, and deposits the cryptographic keys with the respective servers. The routing control server also sends routing information identifying the servers in the chain and a second set of cryptographic keys that correspond to the respective keys in the first set to the client. The client encrypts a message to be sent to the target server with each of the cryptographic keys in the second set of keys it received from the routing control server. The encrypted message is then sent through the chain of servers. When a server in the chain receives the message, it decrypts the message using its cryptographic key and then forwards the decrypted message to the next downstream node on the chain.

While the above-described onion scheme operates to provide confidentiality to both the contents and routing of messages, there are significant drawbacks. For example, the onion encryption scheme requires significant key management, both for the routing control server and each of the other servers in the network. The routing control server must continually generate new encryption/decryption keys, and ensure that each server has the appropriate decryption key. Each server must maintain the corresponding decryption keys, and be able to associate each decryption key with a specific message to be decrypted. Such key management can add significant costs to the infrastructure and operation required for operating the onion encryption scheme. Additionally, with the onion routing scheme, the entire data packet (message and routing) is encrypted multiple times (once for each mix in the routing chain) and must be decrypted multiple times. As data packets are becoming significantly larger in size, this adds additional burdens to the system, thereby decreasing the efficiency of the system.

Thus, there exists a need for methods and systems for providing confidentiality for communications sent via a network that is efficient, easy to implement, and does not require significant key management.

SUMMARY OF THE INVENTION

The present invention alleviates the problems associated with the prior art and provides methods and systems for providing confidentiality of communications sent via a network that is efficient, easy to implement, and does not require significant key management.

According to embodiments of the invention, the identity of each node of the routing path of a communication is encrypted utilizing an identity-based encryption scheme. This allows each node of the routing path to decrypt only those portions of the routing path necessary to send the communication to the next node. Thus, each node will only know the immediate previous node from which the communication came, and the next node to which the communication is to be sent. The remainder of the routing path of the communication, along with the original sender and intended recipient, remain confidential from any intermediate nodes in the routing path. Use of the identity-based encryption scheme removes the need for significant key management to maintain the encryption/decryption keys.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
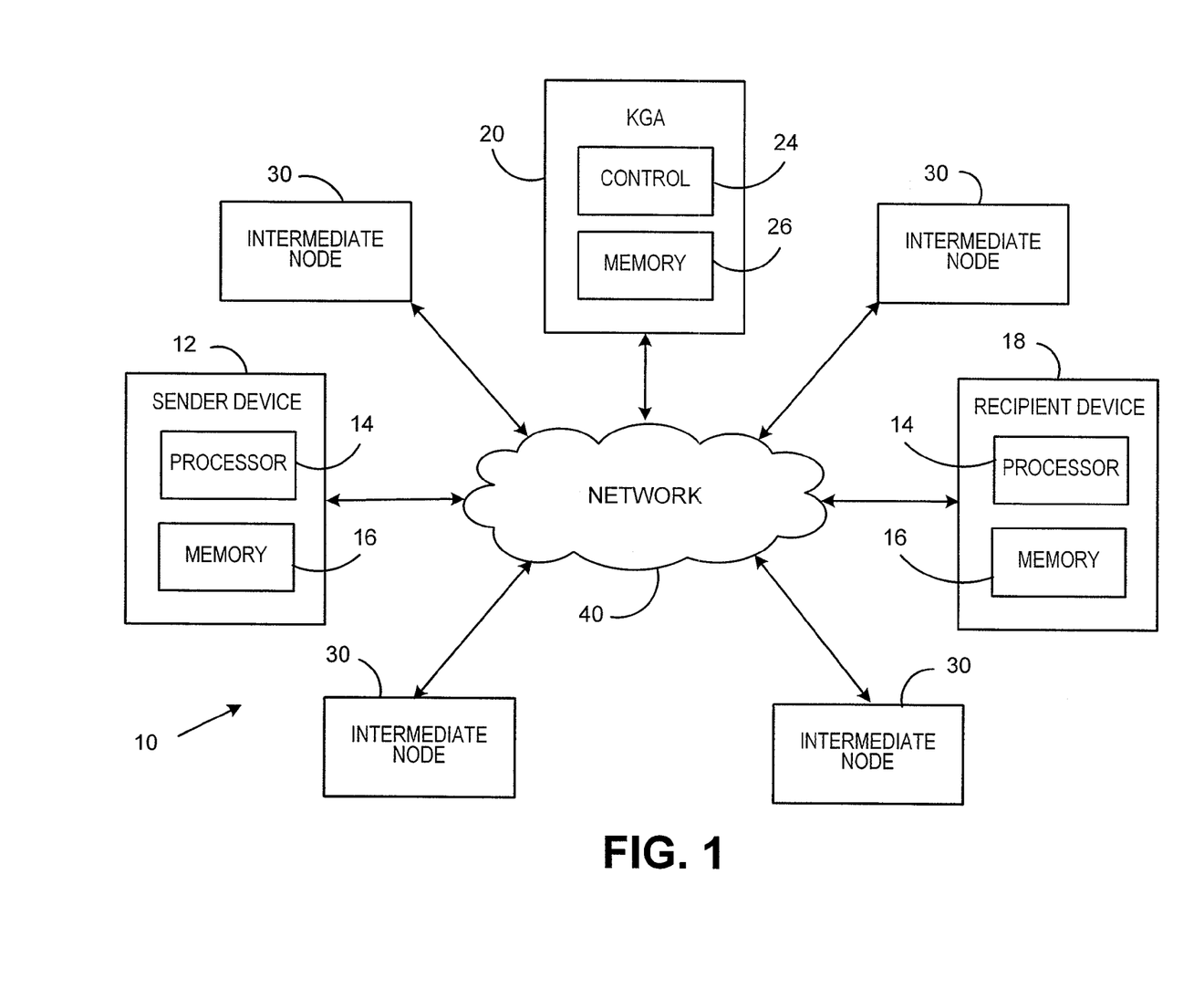
FIG. 1 illustrates in block diagram form a system for providing confidentiality of communications according to embodiments of the present invention.

In describing the present invention, reference is made to the drawings, where there is seen in FIG. 1 in block diagram form a system 10 for providing confidentiality of communications according to an embodiment of the present invention. The system 10 includes a sender device 12 utilized by a sender to prepare a communication desired to be sent to a recipient device 18. Sender device 12 and recipient device 18 can be, for example, a general purpose computer or any other type of computing device that includes one or more special or general purpose processing units 14 and memory devices 16. The system 10 further includes a key generating authority (KGA) 20. KGA 20 includes a control device 24, which may be, for example, a special or general purpose processing device or the like, and a memory 26. The system 10 further includes a plurality of intermediate nodes 30 (also referred to as routers) through which a communication will pass when being sent by the sender device 12 to a recipient device 18. The intermediate nodes 30 can be configured as servers that include one or more processing units and (preferably secure) memory devices (not shown). The sending device 12, recipient device 18, KGA 20 and intermediate nodes 30 are coupled together via a network 40, such as, for example, the internet or the like.

In conventional network routing scenarios, the fully qualified address, i.e., route from sender to recipient, is viewable by all nodes in the network as the message traverses the communication route from the sender to the recipient. The present invention utilizes an identity-based cryptography scheme to provide confidentiality of communications and the routing thereof. The KGA 20 provides a public-key cryptosystem utilized to encrypt/decrypt the message and/or routing information of communications. KGA 20 is preferably a trusted party, such as, for example, a reliable and reputable commercial entity or governmental entity. Public-key cryptosystems allow two people to exchange private and authenticated messages without requiring that they first have a secure communication channel for sharing private keys. In a public-key cryptosystem, each person has a unique pair of keys: a private key that is a secret and a public key that is widely known. This pair of keys has two important properties: (1) the private key cannot be deduced from knowledge of the public key and the message, and (2) the two keys are complementary, i.e., a message encrypted with one key of the pair can be decrypted only with the complementary key of the pair. In one particular type of public-key cryptosystem, keys can be computed from a standardized identifier or identifiers, which need not be secret, associated with the device that will be utilizing the keys. Such identifiers (also referred to as public identifiers) can include, for example, an electronic address (IP address). Because the public key is a publicly known function of only pre-existing public identifiers rather than a key produced from a random seed, this kind of public-key cryptosystem is called an identity-based encryption (IBE) scheme. One implementation of an IBE scheme is described in detail in U.S. Pat. No. 7,113,594, the disclosure of which is incorporated herein by reference, although other similar IBE schemes may also be used.

Figure 2:
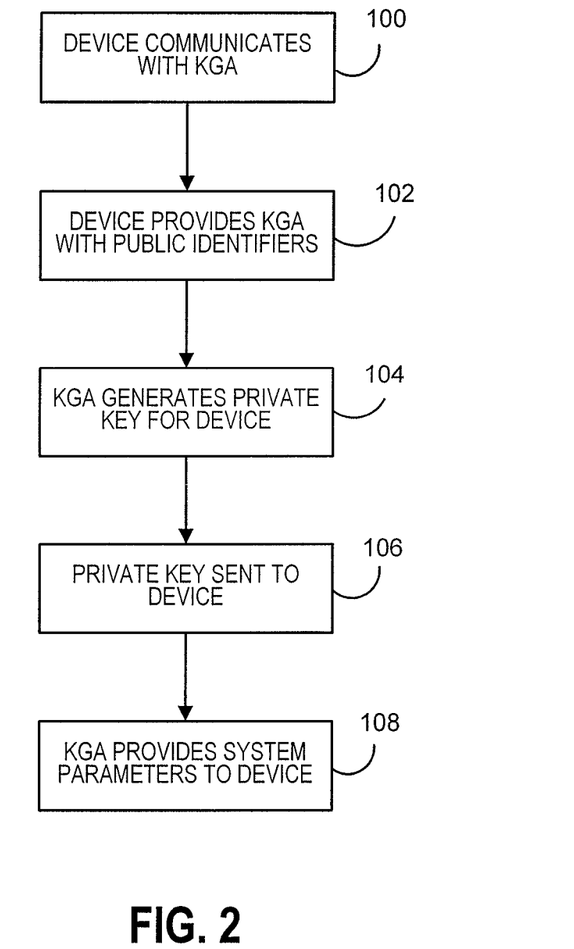
FIG. 2 illustrates in flow diagram form portions of the operation of the system of FIG. 1 according to an embodiment of the present invention.

The operation of the system 10 will be described with respect to FIGS. 2 and 3, which illustrate in flow diagram form the processing performed by the system 10 for sending a communication from the sender device 12 to the recipient device 18. Referring now to FIG. 2, there is illustrated in flow diagram form the processing performed to register a device, e.g., the intermediate nodes 30, the sender device 12, and the recipient device 18, to participate in the system 10 and send and/or receive communications. For clarity, the processing described with respect to FIG. 2 will be limited to a single intermediate node 30, but it should be understood that the processing is similar for each intermediate node 30 that is part of the system 10, as well as for each sender device 12 and recipient device 18 that desires to send secure communications via the network 40. In step 100, the device being registered, e.g., intermediate node 30, communicates with the KGA 20 via a network 40 to exchange information as described below. Preferably, the communication link formed is a secure link to prevent unauthorized access to information being sent between the KGA 20 and the intermediate node 30. Such communication can occur upon initialization of the intermediate node 30, or any other time as desired. In step 102, the intermediate node 30 provides the KGA 20 with certain information, referred to above as public identifiers, associated with the intermediate node 30. Such public identifiers could include, for example, the IP address of the intermediate node 30.

In step 104, KGA 20, utilizing the public identifiers provided by the intermediate node 30, generates a private key for use by the intermediate node 30. More specifically, KGA 20 performs a setup procedure to generate a master secret parameter and system parameters associated with the specific cryptographic algorithm utilized for encryption. The master secret parameter includes, for example, some integer known only to KGA 20. The system parameters include, for example, elliptic curve parameters associated with specific points on the curve used in the cryptographic algorithm, and are made publicly available for use as described below. The master secret parameter and system parameters can be stored in the memory 26 of KGA 20. The control device 24 of KGA 20 uses the public identifier(s) associated with intermediate node 30, along with the master secret parameter stored in memory 26, to generate a private cryptographic key (used for decryption as described below) for the intermediate node 30 that corresponds to a public cryptographic key (used for encryption as described below) that is based on the public identifier(s) associated with the intermediate node 30. Optionally, for added security, the public identifiers could also include the current date. Thus, even in the event that a private key is compromised, the private key would only be valid for a single day when the due date is defined with an accuracy of a single day. This would require that a new private key be generated by the KGA 20 for each device each day. Alternatively, any type of key updating schedule could be implemented, e.g., weekly, monthly, etc. as agreed upon and implemented by the policies of the KGA 20.

In step 106, KGA 20 sends the generated private key to intermediate node 30, where it is stored in a secure memory of the intermediate node. If the device being registered will also be required to perform encryption then in step 108 KGA 20 provides the system parameters associated with the specific cryptographic algorithm utilized for encryption to those devices that will utilize such information to generate corresponding public keys used for encryption as described further below. The system parameters can be provided to the device on a recorded medium for downloading into a memory, or optionally can be obtained via a network communication between the device and KGA 20 using traditional secure communication protocols such as SSL.

Figure 3:
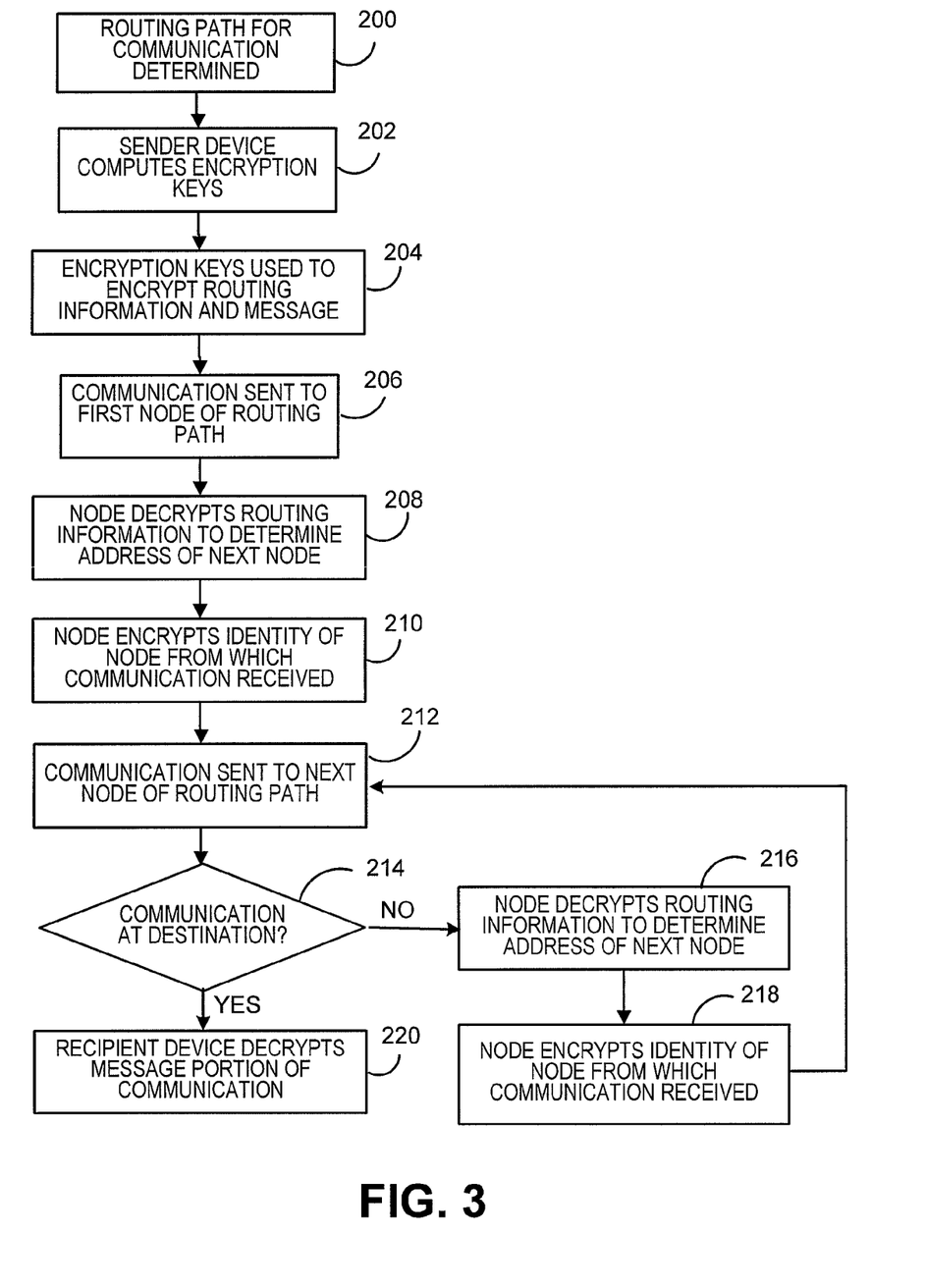
FIG. 3 illustrates in flow diagram form portions of the operation of the system of FIG. 1 according to an embodiment of the present invention.

Referring now to FIG. 3, there is illustrated in flow diagram form the processing performed when a sender device 12 sends a communication to a recipient device 18 utilizing the system 10 of FIG. 1. In step 200, a routing path from the sender device 12 to the recipient device 18 for the communication is determined. This can be performed, for example, by the sender device 12, a network service provider for sender device 12, or some other routing administrator for network 40. The routing path can include one or more of the intermediate nodes 30, as well as other nodes that have not registered with KGA 20 (referred to below as sub-intermediate nodes). In addition, multiple alternative routes can be specified. For example, an intermediate node can be provided with more than one next subsequent node to which the communication can be sent. The decision as to which subsequent node the communication will be sent can be made based on the activity levels of each of the next subsequent nodes such that the next subsequent node that is least busy will be selected, thereby allowing faster processing of the communication. As noted above, each of the intermediate nodes 30 along the routing path, as well as the recipient device 18, is identified by their specific IP address or other public identifiers within the network. The IP address (or other public identifiers) of the intermediate nodes 30, or portions thereof, will be utilized as an input for computing respective encryption keys (public keys), used to encrypt the routing information for the communication. The IP address of the recipient device 18 can be used as an input for computing an encryption key used to encrypt the message. Since each device has a different, unique IP address, the public keys, and hence corresponding private keys, will be different for each recipient device 18 and intermediate node 30. The routing path, i.e., the IP address of each intermediate node 30 and optionally the recipient device 18, is provided to the processor 14 of sender device 12.

In step 202, the sender device 12, using processor 14, computes a respective public encryption key for at least some of the intermediate nodes 30 along the routing path. If the sender wishes to encrypt the message of the communication along with the routing information, then the sender device 12 will also compute a public encryption key for the recipient device 18. As noted above, recipient-based information is utilized as an input for computing the public keys. For example, the IP address, which uniquely identifies the address of the recipient device 12 and intermediate nodes 30, or some portion thereof, can be utilized as an input for computation of the public key associated with each device/node. The public keys are computed using any known algorithm as specified by the KGA 20 based on the specified input(s), e.g., the IP address.

In step 204, the keys determined in step 202 are used to encrypt various portions of the routing information, and if desired, message portion, of the communication. More specifically, the processor 14 will encrypt the address of a successive intermediate node 30 (or alternative successive intermediate nodes 30) in the routing path using the encryption key associated with a previous intermediate node 30 in the routing path, i.e., the intermediate node 30 from which the communication will be sent to the next successive intermediate node 30 (or selected next successive intermediate node 30). The encryption is preferably performed using a known public encryption algorithm that can be part of an application being run by the processor 14. The encryption algorithm utilizes the key formed in step 202 along with the system parameters generated by the KGA 20 that are preferably stored in the memory 16 of the sender device 12. Suppose, for example, that the sender device 12 is sending a communication to recipient device 18 that will pass through, in order, three different intermediate nodes 30, identified as Node A, Node B, and Node C. As noted above, one or more of the nodes can be selected from alternative successive nodes, e.g., Node B could be selected by Node A (as described above) from a group of alternative nodes B1, B2, B3, etc. The communication can be separated into two different portions: the message portion of the communication, and the routing portion of the communication. If the sender desires to keep the message portion confidential, then the processor 14 will encrypt the message portion using the public encryption key calculated for the recipient device 18. Thus, only the recipient device 18, having the private decryption key that corresponds to the public encryption key for recipient device 18, will be able to decrypt the message portion. The processor 14 will encrypt the address for Node B (or addresses for alternative nodes B1, B2, B3 etc.) using the public encryption key calculated for Node A, encrypt the address for Node C using the public encryption key calculated for Node B, and encrypt the address for the recipient device 18 using the public encryption key calculated for Node C. Thus, the address for each leg of the routing portion of the communication, as well as the message portion of the communication, are encrypted using different encryption keys that were calculated by the processor 14. Since the processor 14 of sender device 12 is able to generate the corresponding public keys from information associated with the recipient device 18 and each intermediate node 30 through which the communication will pass, the sender device 12 does not need to receive the public key from each device or KGA 20 beforehand, and therefore does not need to maintain any type of repository to store received public keys. Additionally, there is no need for any type of certificate to ensure the authenticity of the public key. Thus, the key management systems required in conventional systems, e.g., onion encryption systems, are no longer necessary, without any loss of security. Additionally, the message portion need only be encrypted (and decrypted) once, using the public encryption key (and corresponding private decryption key) associated with the recipient, instead of being encrypted and decrypted one time for each node along the route as with the conventional onion encryption schemes.

Figure 4A:
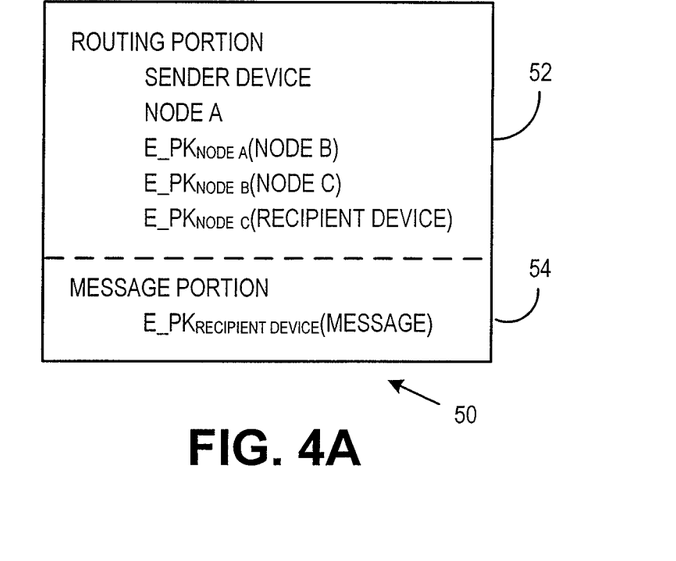
FIGS. 4A-4D illustrate an example of a communication during various stages of delivery.

FIG. 4A illustrates an example of a communication 50 after the processor 14 has encrypted the various portions as described in step 204. The communication 50 includes a routing portion 52, which indicates the route the communication 50 will take through the network 40, and a message portion 54, which includes the actual message. The designation $E\_PK_X(Y)$ indicates that information Y is encrypted using the public encryption key associated with X. Thus, for example as described above, the address for Node B is encrypted using the public encryption key calculated for Node A, the address for Node C is encrypted using the public encryption key calculated for Node B, and the address for the recipient device 18 is encrypted using the public encryption key calculated for Node C. In addition, the message of the communication is encrypted using the public encryption key calculated for the recipient device 18.

Figure 4B:
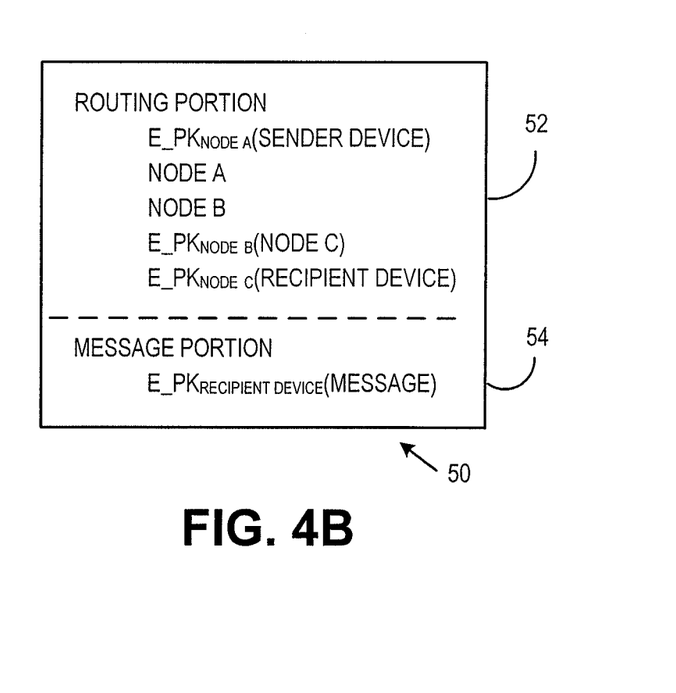

Referring again to FIG. 3, in step 206 the communication is sent from the sender device 12 to the first intermediate node 30 (Node A) along the routing path (which may or may not include sub-intermediate nodes). In step 208, Node A will use its private decryption key to decrypt the routing information to determine where the communication should next be sent, e.g., Node B (or one of Nodes B1, B2, etc.). Since Node A does not have any of the private decryption keys associated with any of the other nodes along the routing path, the complete path, other than the node from which the communication was received and the node to which the communication is to be next delivered, remains confidential. In step 210, to maintain the privacy of the previous routing path of the communication from subsequent nodes, Node A will encrypt the identity of the node, i.e., the IP address, from which it received the communication 50 using its own public encryption key. This will enable Node A (and only Node A) to decrypt the address of the node from which it received the communication 50 in the event a return message needs to be provided, such as, for example, an error message, return receipt message or the like. FIG. 4B illustrates the communication 50 after the processing of step 210.

Figure 4C:
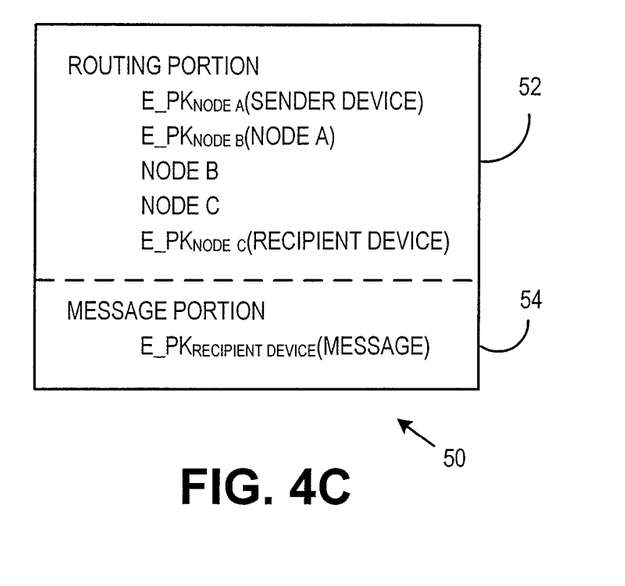

In step 212, Node A sends the communication 50 to Node B (or one of the selected alternative nodes B1, B2, B3 as described above). This may be by, for example, a direct link between Node A and Node B, or alternatively may include one or more sub-intermediate nodes, e.g., Nodes $A_1$, $A_2$, etc. The sub-intermediate nodes will only know that the message is being passed from Node A to Node B, but will have no other information about the sender or recipient of the message, or of the contents of the message itself. In step 214, the node that has received the communication will determine if the communication is at its destination or if there are subsequent nodes along the routing path. If it is determined that the communication is not at its destination, then in step 216 the node that received the communication, e.g., Node B, will decrypt the next node along the routing path using its private decryption key to determine where the communication should next be sent, e.g., Node C. Since Node B does not have any of the private decryption keys associated with any of the other nodes along the routing path, the complete path, other than the node from which the communication was received and the node to which the communication is to be next delivered, remains confidential. In step 218, to maintain the privacy of the previous routing path of the communication from subsequent nodes, Node B will encrypt the identity of the node, i.e., the IP address, from which it received the communication 50 using its own public encryption key. FIG. 4C illustrates the communication 50 after the processing of step 216.

Figure 4D:
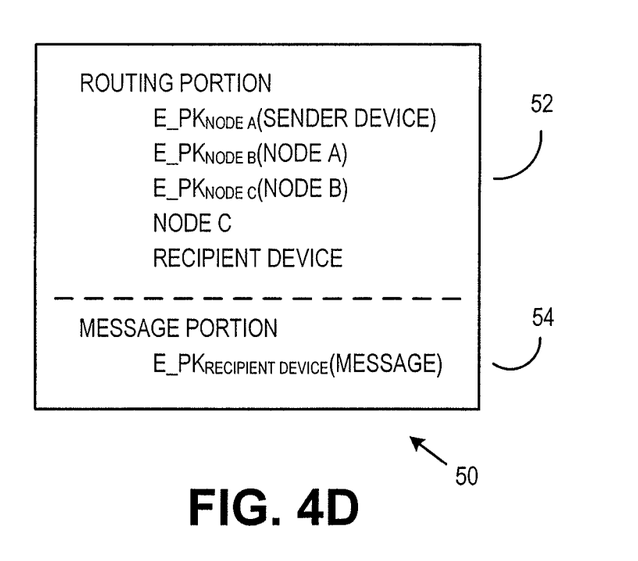

The method then returns to step 212, where Node B sends the communication 50 to Node C. In step 214, Node C will determine if the communication is at its destination, and if not, in step 216 decrypt the next node along the routing path using its private decryption key to determine where the communication should next be sent, e.g., Recipient Device 18. In step 218, to maintain the privacy of the previous routing path of the communication from subsequent nodes, Node C will encrypt the identity of the node, i.e., the IP address, from which it received the communication 50 using its own public encryption key. FIG. 4D illustrates the communication 50 after Node C performs the processing of step 218.

The method then returns again to step 212, where Node C sends the communication 50 to the recipient device 18. In step 214, the processor 14 of the recipient device 18, will realize that it is the destination of the communication 50 (since there are no further nodes in the routing path), and in step 220 will decrypt the message portion 54 of the communication 50 using its private decryption key, and the decrypted message is provided to the recipient (using, for example, a display of the recipient device 18). By using the encryption scheme as described above, the confidentiality of both the message and routing of the communication is protected. Only the first intermediate node in the routing path and possibly the recipient (if the sender signs the message) will know the original sender of the communication, and only the sender and the last intermediate node in the routing path will know the intended recipient of the communication. Each of the other intermediate nodes along the routing path will only be able to determine the preceding node from which the communication was received and the next succeeding node along the routing path to which the communication should be delivered.

In addition to, or alternatively to, using the current date as part of the input when generating the cryptographic keys, additional security could also be provided by combining the IP address of each node along the routing path with one or more random numbers that are sent along with the communication. This would require that each of the intermediate nodes 30 request a corresponding private decryption key "on-demand" when the communication and random number are received from the preceding node. Thus, in the example provided above, when the sender device 12 computes the public encryption keys used to encrypt the routing portion and, if desired, message portion of the communication, the processor 14 will also utilize one or more random numbers as an input along with the IP address (and optionally the date). The random number can be encrypted in the same chain like fashion as the routing path. For example, the processor 14 will encrypt the address and random number for Node B using the public encryption key calculated for Node A, encrypt the address and random number for Node C using the public encryption key calculated for Node B, and encrypt the address and random number for the recipient device 18 using the public encryption key calculated for Node C. When the sender device 12 sends the communication to Node A, it also sends the random number used to generate the encryption key associated with Node A. Node A sends the random number to the KGA 20 and requests its corresponding decryption key. The KGA 20 would provide suitable authentication processes to ensure that the party requesting the decryption key for Node A is really Node A. Node A uses the decryption key to decrypt the routing portion to determine that Node B is the next node along the routing path, and also to decrypt the random number associated with Node B.

Node A then sends the communication to Node B, along with the random number associated with Node B. Node B sends the random number to the KGA 20 and requests its corresponding decryption key. The KGA 20 would provide suitable authentication processes to ensure that the party requesting the decryption key for Node B is really Node B. Node B uses the decryption key to decrypt the routing portion to determine that Node C is the next node along the routing path, and also to decrypt the random number associated with Node C. Node B then sends the communication to Node C, along with the random number associated with Node C. Node C sends the random number to the KGA 20 and requests its corresponding decryption key. The KGA 20 would provide suitable authentication processes to ensure that the party requesting the decryption key for Node C is really Node C. Node C uses the decryption key to decrypt the routing portion to determine that the recipient device 18 is the next node along the routing path, and also to decrypt the random number associated with the recipient device 18. Node C then sends the communication to recipient device 18, along with the random number associated with the recipient device 18. The recipient device 18 sends the random number to the KGA 20 and requests its corresponding decryption key. The KGA 20 would provide suitable authentication processes to ensure that the party requesting the decryption key for the recipient device 18 is really the recipient device 18. The recipient device 18 uses the decryption key to decrypt the message portion of the communication.

In the above described example, the KGA 20 can maintain a record of requests for encryption keys, including the random numbers. Sender device 12 could send a request to KGA 20 containing a node identifier and the random number used for that note. KGA 20 could then provide notification to sender device 12 if that node has requested a decryption key using that random number. Sender device 12 could use such information to track delivery of a message, measure performance, etc.

While the preceding description was based on an electronic communication and digital delivery network, the present invention can also be utilized for physical communications, e.g., mail pieces, being delivered through a physical delivery network. For example, a mail piece typically contains sender and recipient information, as well as information for different nodes along the delivery network, such as, for example, sender's carrier, sender's local post office, sender's regional post office, sender's country post office, recipient's country post office, recipient's regional post office, recipient's local post, and the recipient's carrier. Each of these could correspond to an intermediate node as described above, and can have a unique identification that a sender can utilize as an input for generating a public encryption key (as described above) when preparing a mail piece. Thus, when addressing a mail piece, the sender device 18 would print the encrypted information on the mail piece, and each node along the routing path, e.g., local post office, regional post office, etc., would decrypt the information to determine the next node to which the mail piece should be delivered.

Thus, according to the present invention, methods and systems for providing confidentiality of communications sent via a network that is efficient, easy to implement, and does not require significant key management are provided. While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for processing a communication to be sent from a sending processing device to a destination processing device via a routing path in a network, the routing path including a plurality of intermediate nodes in the network, the method comprising:
   computing, by a key generating processing device, a respective encryption key associated with each of the plurality of intermediate nodes of the routing path, each of the respective encryption keys being computed based on a public identifier associated with each of the plurality of intermediate nodes and a current date, wherein the public identifier associated with each of the plurality of intermediate nodes is an address of each intermediate node in the network;
   encrypting, by the sending processing device, only an address of each successive intermediate node of the routing path using the encryption key of each respective previous intermediate node of the routing path and an address of the destination processing device using the encryption key of an intermediate node immediately preceding the destination processing device along the routing path; and
   sending the communication by the sending processing device, including the encrypted addresses of each of the plurality of intermediate nodes of the routing path, to a first one of the plurality of intermediate nodes.

2. The method of claim 1, wherein computing a respective encryption key associated with each of the plurality of intermediate nodes further comprises:
   computing a respective encryption key associated with each of the plurality of intermediate nodes based on the address of each of the plurality of intermediate nodes, a current date, and a respective random number associated with each of the plurality of intermediate nodes.

3. The method of claim 2, further comprising:
   encrypting the random number associated with each successive intermediate node of the routing path using the encryption key of each previous intermediate node of the routing path; and
   sending the encrypted random numbers associated with each of the plurality of intermediate nodes along with the communication to the first one of the plurality of intermediate nodes.

4. The method of claim 2, further comprising:
   receiving a notification that an intermediate node has requested a corresponding decryption key based on the respective random number associated with the intermediate node.

5. The method of claim 1, further comprising:
   computing an encryption key associated with the destination processing device based on a public identifier associated with the destination processing device; and
   encrypting a message portion of the communication using the encryption key associated with the destination processing device.

6. The method of claim 5, wherein the public identifier associated with the destination processing device is an address of the destination processing device in the network.

7. A method for processing and sending a communication along a routing path in a communication network having a plurality of nodes, the method comprising:
   receiving, by a processing device, the communication from a previous node along the routing path;
   decrypting, by the processing device, an address included with the communication for a next successive node along the routing path using a private decryption key associated with the one of the plurality of nodes, the private decryption key being based on a public identifier associated with the one of the plurality of nodes;
   encrypting, by the processing device, the address of the previous node using an encryption key associated with the one of the plurality of nodes, the encryption key being based on a public identifier associated with the one of the plurality of nodes, wherein each of the plurality of nodes has an associated address in the network and the public identifier for each node is its associated address in the network; and
   sending, by the processing device, the communication, including the encrypted address of the previous node, to the next successive node along the routing path.

* * * * *